(12) United States Patent  (10) Patent No.: US 8,550,065 B2
Johnson  (45) Date of Patent: Oct. 8, 2013

(54) ADJUSTABLE HEIGHT OUTDOOR COOKER

(76) Inventor: Scott Arnold Johnson, Trufant, MI (US)

( * ) Notice: Subject to any disclaimer, the term of this patent is extended or adjusted under 35 U.S.C. 154(b) by 297 days.

(21) Appl. No.: 13/020,398

(22) Filed: Feb. 3, 2011

(65) Prior Publication Data

US 2011/0192390 A1 Aug. 11, 2011

Related U.S. Application Data

(60) Provisional application No. 61/301,795, filed on Feb. 5, 2010.

(51) Int. Cl.
 *F24B 3/00* (2006.01)
(52) U.S. Cl.
 USPC ..... 126/30; 126/25 A; 126/25 AA; 126/25 R; 126/29; 126/506; 248/158; 248/519; 248/535; 248/545
(58) Field of Classification Search
 USPC ...... 126/25 A, 25 AA, 25 R, 29, 30; 248/158, 248/519, 535, 545
 See application file for complete search history.

(56) References Cited

U.S. PATENT DOCUMENTS

| | | | | |
|---|---|---|---|---|
| 3,784,250 A * | 1/1974 | Beeman | .................... | 297/184.1 |
| 4,094,296 A * | 6/1978 | Beagley | ......................... | 126/30 |
| 4,257,493 A * | 3/1981 | Beckham | ..................... | 187/262 |
| 4,269,164 A * | 5/1981 | Van Grinsven et al. | ........ | 126/30 |
| 4,338,703 A * | 7/1982 | Tanner | .......................... | 452/187 |
| 4,854,297 A * | 8/1989 | Shuman | ........................ | 126/30 |
| 4,903,372 A * | 2/1990 | Jones | ............................ | 452/187 |
| 5,297,534 A | 3/1994 | Louden | | |
| 5,445,487 A * | 8/1995 | Koscinski, Jr. | ............. | 414/543 |
| 5,666,940 A | 9/1997 | Kreiter | | |
| 5,752,799 A * | 5/1998 | Carey et al. | .................. | 414/543 |
| 5,944,009 A | 8/1999 | Scheller | | |
| 6,298,843 B1 | 10/2001 | Olsen et al. | | |
| 6,401,739 B1 * | 6/2002 | Bright et al. | .................... | 135/98 |
| 6,499,610 B2 * | 12/2002 | Spitsbergen | ................. | 212/179 |
| 6,578,568 B1 | 6/2003 | Dufort et al. | | |
| 6,705,821 B2 * | 3/2004 | Philipps et al. | .............. | 414/462 |
| 2007/0089729 A1 | 4/2007 | Moses | | |

\* cited by examiner

*Primary Examiner* — Kenneth Rinehart

*Assistant Examiner* — Jorge Pereiro

(74) *Attorney, Agent, or Firm* — Price Heneveld LLP

(57) ABSTRACT

The present invention provides a permanent foundation which supports an open flame cooking assembly which includes a collapsible boom support arm which supports a cooking surface or grill which is height adjustable via a winch and heat resistant rope adjustment assembly, wherein the boom is supported by an upright stanchion of varying length which is removably and rotatably coupled to the permanent foundation support assembly.

20 Claims, 4 Drawing Sheets

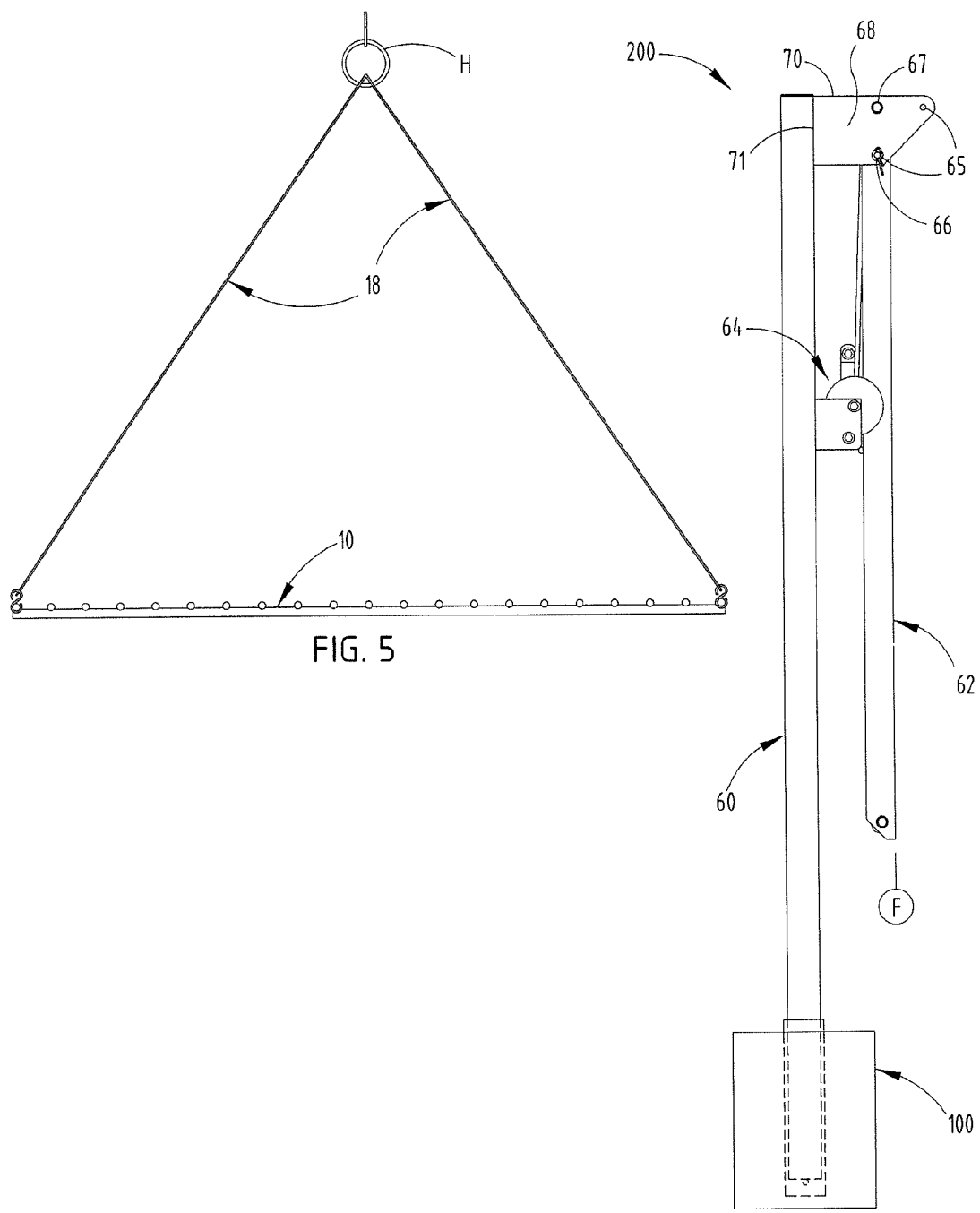

ADJUSTABLE HEIGHT OUTDOOR COOKER

CROSS-REFERENCE TO RELATED APPLICATIONS

This application claims priority under 35 U.S.C. §119(e) and the benefit of U.S. Provisional Application No. 61/301,795 entitled ADJUSTABLE HEIGHT OUTDOOR COOKER, filed on Feb. 5, 2010, by Scott Arnold Johnson, the entire disclosure of which is incorporated herein by reference.

TECHNICAL FIELD

The present invention generally relates to an adjustable outdoor cooker, and more particularly, to an adjustable outdoor cooker for cooking food over an open flame wherein the height of the cooking surface, among other aspects of the outdoor cooker, is adjustable.

BACKGROUND OF THE INVENTION

The preparation of food over an open flame is one of the oldest ways to prepare food and is a long standing American tradition. In furtherance of this tradition, numerous types of outdoor grills have been developed for fixedly supporting a cooking surface over an outdoor fire. Many simple assemblies have been developed which include side supports, such as rocks, bricks or other non-flammable materials to support a mesh cooking surface to be used as a grill.

Some cooking assemblies provide portable upright stanchions which can support a cooking surface over a fire source wherein the cooking surface can be adjusted vertically and rotated away from the fire source. Although the foregoing assemblies permit height adjustable cooking surfaces over an open flame, they do not accommodate the cooking of more substantial food items. The foregoing assemblies also do not allow for the height adjustment necessary to obtain optimal cooking conditions because their limited height does not provide for sufficient temperature variance. The foregoing assemblies are also very unstable in operation and their stability is often conditioned on ideal soil and weather conditions. The foregoing assemblies are easily affected by weather factors such as wind conditions and the cooking surfaces are often rendered unstable due to the soil and weather conditions which can lead to ruined food being displaced or even dropped from the cooking surface. Also, the foregoing assemblies generally require the portable upright support stanchion to be set up too close to the fire source such that the entire apparatus heats up considerably, and is therefore dangerous to adjust once cooking has begun.

The cooking assembly of the present invention provides a permanent and plumb support system for supporting the cooking assembly wherein the support system can be used in a myriad of outdoor soil conditions such that ideal soil conditions are not required. The cooking assembly can be used year round in a fixed location or moved to other permanent support systems and allows for the cooking of more substantial food items with 360° rotation and infinite height adjustment which is described in greater detail below. The present cooking assembly can also be broken down when not in use for easy storage.

SUMMARY OF THE INVENTION

Accordingly, the present invention provides a permanent foundation which supports an open flame cooking assembly which includes a collapsible boom support arm which supports a cooking surface or grill which is height adjustable via a winch and heat resistant rope adjustment assembly, wherein the boom is supported by an upright stanchion of varying length which is removably and rotatably coupled to the permanent foundation support assembly.

In another embodiment of the present invention, an outdoor cooking assembly comprises a support assembly in an upright stanchion. The stanchion can be coupled to the support assembly and removed when not in use. Thus, the stanchion is removably and rotatably coupled to the support assembly. The outdoor cooking assembly further comprises a boom which is operably coupled to the stanchion, and the boom is movable between an extended position and a vertical position, such that the boom is collapsible. The outdoor cooking assembly further includes a height adjustment assembly which connects to a harness which connects to a cooking surface in such a manner that the cooking surface can be adjusted vertically by the adjustment of a length of heat resistant rope or cable by the height adjustment assembly. The height adjustment assembly further comprises a cable adjustment mechanism.

In yet another embodiment of the present invention, a permanent foundational support assembly is coupled to an upright stanchion which can be rotated as coupled to the support assembly. A boom assembly is coupled to the stanchion in such a fashion that the boom assembly is movable between an extended position and a collapsed position. In this embodiment, a height adjustment assembly comprises a cable, winch and pulley system. The height adjustment assembly connects to a harness which further connects to a cooking surface such that the cooking surface can be vertically adjusted by the height adjustment assembly.

In yet another embodiment of the present invention, an outdoor cooking system comprises a plurality of permanent foundation support assemblies and at least one upright stanchion which can be removably and rotatably coupled to any one of the support assemblies. In this system, the stanchion can be moved from any one of the plurality of support assemblies to another. The stanchion is operably coupled to a boom assembly which is collapsible between an extended position and a vertical collapsed position. In this outdoor cooking system, a height adjustment assembly is used to vertically adjust a cooking surface which is attached to a harness in such a fashion that the cooking surface is vertically adjustable by the height adjustment assembly.

These and other features, advantages and objects of the present invention will be further understood and appreciated by those skilled in the art by reference to the following specification and appended drawings.

BRIEF DESCRIPTION OF THE DRAWINGS

The foregoing aspects and many of the advantages of this invention will become more readily appreciated by reference to the following detailed description, when taken in conjunction with the accompanied drawings, wherein:

FIG. 5 is a side elevational view of a cooking surface and support wire assembly; and FIG. 6 is a perspective view of the cooking apparatus shown in FIG. 4.

DETAILED DESCRIPTION OF PREFERRED EMBODIMENT

Figure 1:
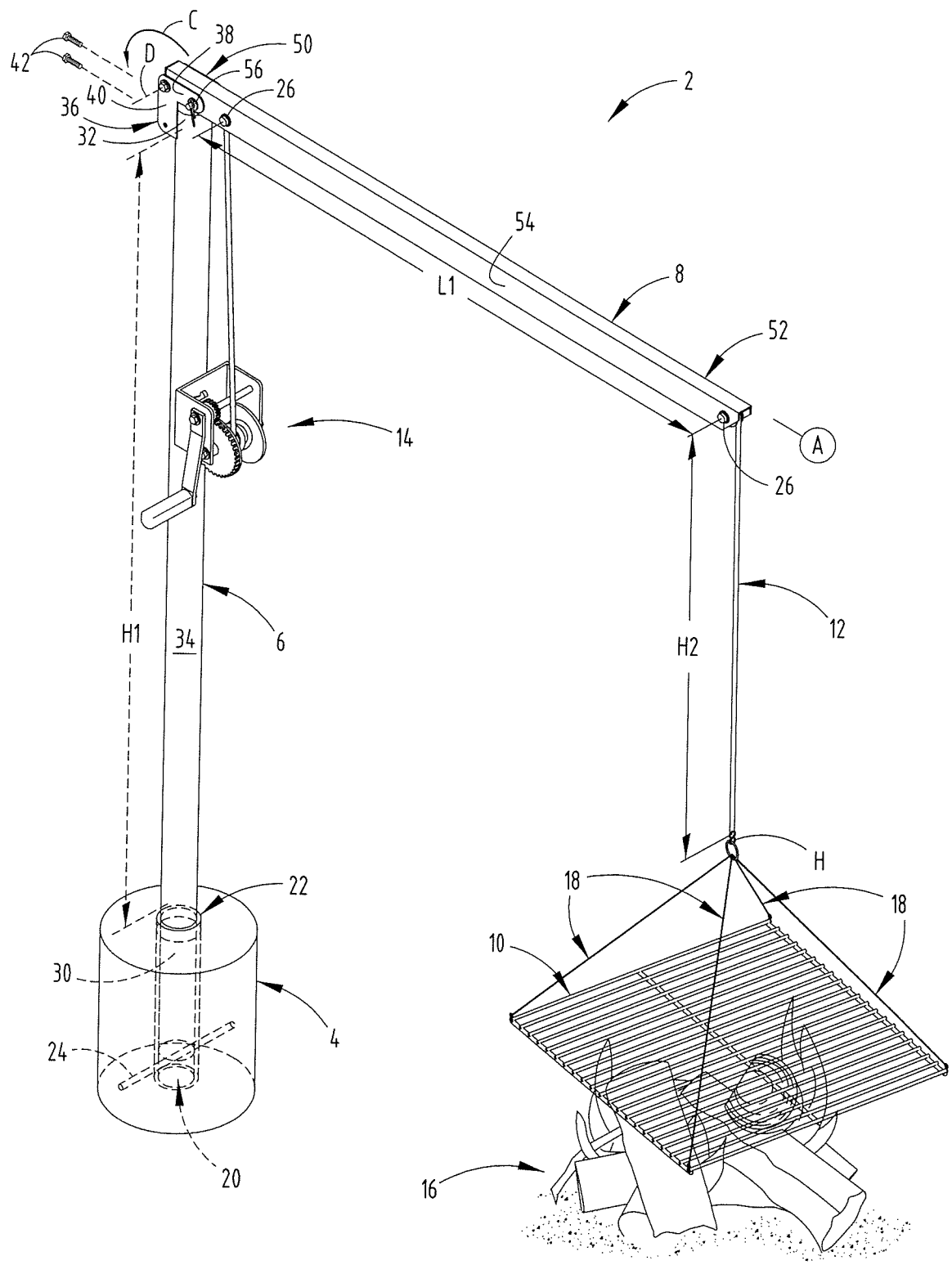
FIG. 1 is a perspective view of an outdoor cooking assembly embodying the present invention.

For the purposes of description herein, the terms "upper," "lower," "right," "left," "rear," "front," "vertical," "horizontal," "top," "bottom" and derivates thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification, are simply exemplary embodiments. Hence, specific dimensions and other physical characteristics relating to the embodiments disclosed herein are not to be construed as limiting, unless expressly stated otherwise.

Figure 2:
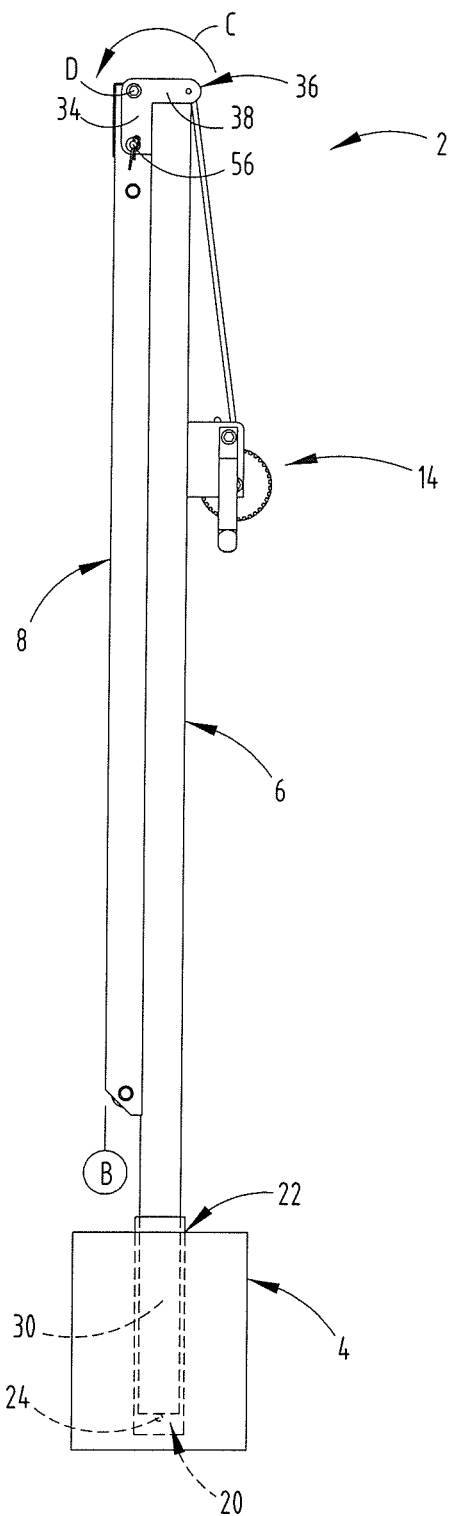
FIG. 2 is a side elevational view of the present invention.

With reference now to the drawings, in particular FIG. 1, an outdoor cooking assembly 2 is illustrated comprising a foundational support assembly 4 which is operably and rotatably coupled to an upright stanchion 6. The upright stanchion 6 is operably coupled to a boom 8 which is rotatable in the direction indicated by the arrow C between an extended position A (FIG. 1) and a collapsed position B (FIG. 2). The outdoor cooking assembly 2 further includes a cooking surface 10 which is operable and adjustably coupled to the boom 8. In the embodiment shown in FIG. 1, the cooking surface 10 is a square shaped cooking surface with a lined grill or mesh configuration. However, it is to be understood that other shaped surface configurations will be apparent to those skilled in the art.

In the embodiment shown in FIG. 1, the cooking surface 10 is operably and height adjustably coupled to the boom 8 by a wire rope or cable 12 which is a heat resistant rope or cable. The heat resistant rope 12 is operably connected to a winch 14 which is operably coupled to the upright stanchion 6 and adjusts the length of the heat resistant rope 12 thereby adjusting the height of the cooking surface towards or away from a heat source as described below.

Figure 3:
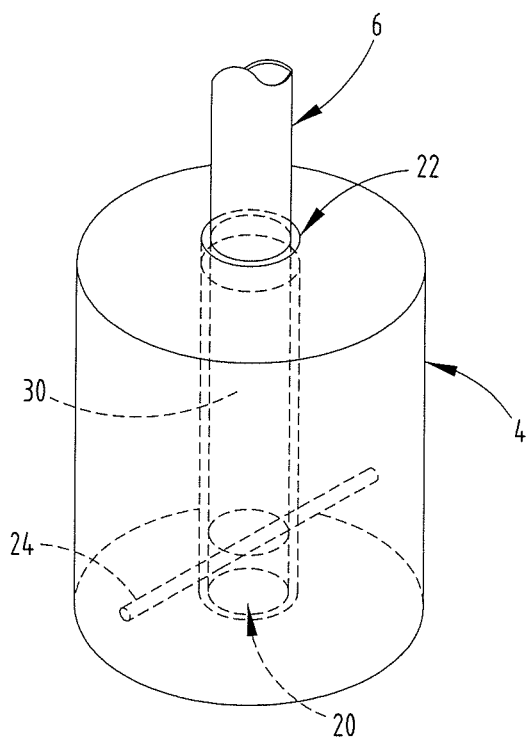
FIG. 3 is a fragmentary perspective view of a support assembly

In the embodiment shown in FIG. 3, the foundational support assembly 4 is a cylinder shaped block which can be formed from hardened concrete or other like material. The foundational support assembly 4 further comprises a cavity 20 which engages a pipe sleeve and bushing assembly 22 which rotatably accepts the upright stanchion 6. The pipe sleeve and bushing assembly 22 can be a made from a piece of steel pipe with a PVC insert that accepts the stanchion 6, or a section of PVC pipe alone can accept the stanchion 6. The foundational support assembly 4, further comprises a pipe sleeve stop bar 24 which limits the depth to which the pipe sleeve and bushing assembly 22 can be inserted into the cavity 20 of the foundational support assembly 4 and also limits the depth at which the stanchion 6 can be inserted in to cavity 20. In assembly, the upright stanchion 6 rotates about the fixed foundational support assembly 4 thus allowing the outdoor cooking assembly 2 to rotate 360° relative to the foundational support assembly 4. Set screws can be used to limit the rotation of the cooking assembly. In operation, the foundational support assembly 4 can be set up on a variety of surfaces in a variety of soil conditions or be partially or completely buried in the ground.

In the embodiment shown in FIG. 1, the upright stanchion 6 has a lower end 30, an upper end 32, and a vertical portion 34. The lower end 30 of the upright stanchion 6 is received by the pipe sleeve and bushing assembly 22 for an operable, rotatable and removable connection with the foundational support assembly 4 without the need for tools to secure the connection. The vertical portion 34 of the upright stanchion 6 has a height H1 which determines the overall height of the outdoor cooking assembly 2. The upper end 32 of the upright stanchion 6 terminates, in this embodiment, into an L-shaped bracket 36 and fastener system. The L-shaped bracket 36 has U-shaped channels disposed along both a horizontal portion 38 and a vertical portion 40. The L-shaped bracket 36 is affixed to the upright stanchion 6 via fasteners 42 which can be fastened to the upright stanchion 6 through either the U-shaped channel disposed on the horizontal portion 38 or the vertical portion 40 of the L-shaped bracket 36.

In the embodiment shown in FIG. 1, the boom 8 is a rectangle shaped tube having a first end 50 and a second end 52 along with a body portion 54 having a length L1. The first end 50 is pivotally coupled to the L-shaped bracket 36 at pivot point D by a fastener and washer system as known in the art. Boom 8 is positively captured in the horizontal portion 38 of the L-shaped bracket 36 and secured with a removable bolt and quick pin system 56. The bolt and quick pin system generally refers to a bolt which is retained in place by a pin which can be removed without tools as known in the art, however, other quick release fasteners are also contemplated.

As shown in FIG. 2, the boom 8 can have the bolt and quick pin system 56 removed from the horizontal portion 38 of the L-shaped bracket 36 such that the boom 8 can pivot around pivot point D in the direction of arrow C such that the boom 8 is then positively captured in the U-shaped channel of vertical portion 34 of the L-shaped bracket 36. The bolt and quick pin system 56 can then be moved to the vertical portion 34 of the L-shaped bracket 36 to secure the boom 8 in the collapsed position B.

As shown in FIG. 1, the boom 8 has a length L1 which corresponds to the length that the boom 8 is laterally extended from the upright stanchion 6 when the boom 8 is in the extended position A. The length L1 also correlates to the length at which the fire source 16 is distanced from the foundational support assembly 4.

The cooking surface 10 is infinitely adjustable along a length H2 by a height adjustment assembly. As shown in FIG. 1, the height adjustment assembly includes a heat resistant rope 12 that can be adjusted via a winch 14 by either letting out or receiving the heat resistant rope 12 from the winch 14. Adjusting the cooking surface 10 allows the user to vary the temperature intensity at which the food is cooked over the fire source 16. In the embodiment shown in FIG. 1, the cooking surface 10 is attached to the heat resistant rope 12 by a harness which is shown here as a series or plurality of heat resistant ropes or cables 18. The harness can also be constructed of a plurality of rigid steel bars that hold the cooking surface in place. The series of heat resistant ropes 18 is removable from heat resistant rope 12 at point H such that the boom 8 can be moved into position B without the need for the cooking surface 10 to make the rotation of the direction of arrow C. The boom 8 comprises one or more pulleys 26 which house and channel the heat resistant rope 12 through the interior of the boom 8 and allow for the heat resistant rope 12 to be drawn in or be let out by the winch 14.

As shown in FIG. 5, a cooking surface 10 is suspended by a harness 18 which, in this embodiment, is made up of a series of wires which attach to the cooking surface at the outer corners of the cooking surface by means known in the art. The harness attaches to the outer corners of the cooking surface 10 in order to properly balance the cooking surface 10 and keep the cooking surface even as it is vertically adjusted over the heat source. The series of wires or harness 18 is connected to the heat resistant rope 12 at a point H by means known in the art, such as a cleat or ring, which makes the cooking surface detachable from the heat resistant rope 12 when the user wishes to collapse the boom of the outdoor cooking assembly.

Figure 4:
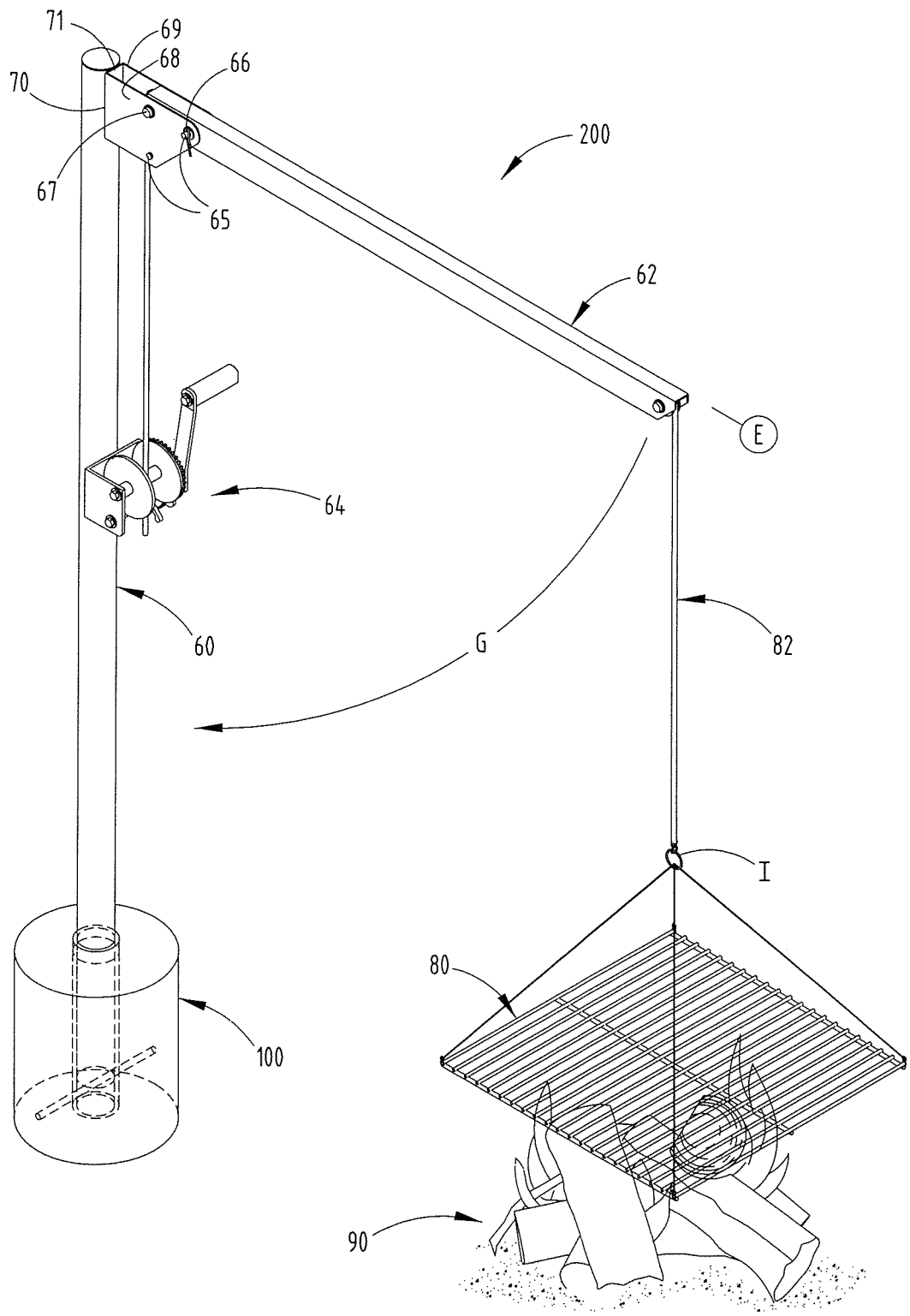
FIG. 4 is a side elevational view of another embodiment of the present invention.

In another embodiment of the present invention, FIG. 4 shows an outdoor cooking assembly 200 including an upright stanchion 60 which is operably coupled to a winch 64 and has a collapsible boom 62 operably coupled to the upright stanchion 60 by a bracket 68. The boom 62 is secured in an extended position E which extends the boom 62 laterally away from the upright stanchion 60. When in the extended position E, the boom 62 is secured by a bolt and quick pin system 66 operably coupled to bracket 68. In the embodiment shown in FIG. 4, boom 62 is collapsible between a position E to a collapsed position F (FIG. 6). In order to move the boom 62 from its laterally extended position E to a collapsed position F, the user of the outdoor cooking assembly 200 must remove the bolt and quick pin system 66 which is disposed in an upper aperture 65 on bracket 68 as described below.

Bracket 68 comprises a generally U-shaped configuration having side walls 70 and 69 and a back wall 71 which is operably coupled to the upright stanchion 60. The boom 62 is pivotally coupled to the bracket 68 at a pivot point 67 which comprises a nut bolt and washer system, as known in the art, for securing the boom 62 to the bracket 68 while allowing the boom to pivot at pivot point 67 in the direction shown by arrow G. The bracket 68 further comprises two apertures 65 wherein one aperture is an upper aperture and one aperture is a lower aperture. As shown in FIG. 4, the upper aperture 65 houses a bolt and quick pin system 66 for retaining the boom 62 in a laterally extended position E. Once the quick pin system 66 is removed from the upper aperture 65 of bracket 68, it can be moved to the lower aperture 65 of bracket 68 to retain the boom 62 in the collapsed position F as shown in FIG. 6. Pivot point 67 of bracket 68 further comprises a pulley which is used to guide a heat resistant rope 82 for vertical adjustment of the cooking surface 80 over a fire or heat source 90. A similar pulley is also disposed at the outer most end of the boom 62 where the heat resistant rope 82 goes from a horizontal length contained within the boom 62 to a vertical length downward toward the cooking surface 80. In the embodiment shown in FIG. 4, the cooking surface 80 is detachably connected to the heat resistant rope 82 at the point I by a means known in the art. Similar to the embodiment shown in FIG. 1, the embodiment in FIG. 4 can adjust the vertical height of the cooking surface 80 over the heat source 90 by using the winch 64 as known in the art.

In operation, the outdoor cooking assembly 2 provides for a very strong base via the permanent foundation support assembly 4 such that the outdoor cooking assembly 2 can be set up in a variety of terrains and soil conditions while still providing a plumb or level foundation that allows for an upright stanchion to be consistently secured to the foundation in a vertical configuration. The length L1 of the boom also provides for a substantial distance of the upright stanchion 6 and foundational support assembly 4 from the fire source area 16 thereby keeping the heat of the outdoor cooking assembly 2 (beyond that of the cooking surface 10) to a minimum and also allowing room for the user to pass through between the fire source or campfire area 16 and the upright stanchion 6. The outdoor cooking assembly 2 can further pivot about the pipe and sleeve bushing assembly 22 such that the cooking surface 10 can be rotated away from the fire source 16 for safe and easy placement of food onto the cooking surface 10 and then rotated back above the fire source 16 for cooking the food. The foundational support assembly 4 can be made to be perfectly plumb without the need for adjustment such that rotation of the outdoor cooking assembly 2 is stable, consistent, and secure.

In operation, the cooking surface 10 can be raised and lowered via the heat resistant rope 12 by operation of the winch 14. This is done with great ease given the lifting power of the winch 14. In a collapsed position, the outdoor cooking assembly 2 can be removed from the foundational support assembly 4 and moved to another foundational support assembly 4 in an outdoor cooking system having a plurality of foundational support assemblies without the need for tools. Thus, the outdoor cooking assembly 2 is ideal for campgrounds and parks wherein several foundational support assemblies 4 can be installed.

Given the stability of the foundational support assembly 4, the upright stanchion 6 and the boom 8 are able to hold the cooking surface 10 steady and the entire outdoor cooking assembly 2 is more resistant to variances due to external conditions such as wind. This stability also allows the outdoor cooking assembly 2 to handle more substantial food items than the outdoor cookers known in the art.

The components of the outdoor cooking assembly 2 can be made from aluminum or galvanized steel wherein the aluminum would decrease the weight of the outdoor cooking assembly 2 and wherein the aluminum or galvanized steel would provide corrosion resistance. The series of wires 18 and the cooking surface 10 may be made of stainless steel or plated steel due to the proximity of these components to the food. The main heat resistant rope 12 can be constructed of a galvanized steel wire rope, heat resistant cable or the like that is designed to resist both heat and corrosion.

Optionally, the foundation assembly 4 can have an aluminum outer cover with an inner sleeve made of PVC material providing both corrosion resistance and replaceable componentry that the end user can change out as needed.

When the outdoor cooking assembly 2 is removed from the foundational support assembly 4, it is contemplated that the foundational support assembly 4 can be used to install accessories such as a campfire table, a swivel chair, a fire wood organizer, a rotating cooking spit, a campfire bench, or other such accessories that would take advantage of the sound structural support of the foundational support assembly 4. The interchangeability of the accessories as noted above could be done without requiring any tools. When the outdoor cooking assembly 2 is removed from the foundation support assembly 4, it can be folded in the manner as shown from FIG. 1 to FIG. 2 for easy storage. Optionally, if the outdoor cooking assembly 2 remains outdoors, an outdoor cooking assembly cover (not shown) could be used to cover the outdoor cooking assembly 2 to protect the components from the elements.

The above description is considered that of the preferred embodiments only. Modifications of the invention will occur to those skilled in the art and to those who make or use the invention. Therefore, it is understood that the embodiments shown in the drawings and described above is/are merely for illustrative purposes and not intended to limit the scope of the invention, which is defined by the following claims as interpreted according to the principles of patent law, including the doctrine of equivalents.

The invention claimed is:

1. An outdoor cooking assembly comprising:
    a support assembly including a block member having a cavity portion disposed therein, and further including a stop member transversely disposed within the cavity portion;

a sleeve member received in the cavity portion of the block member, the sleeve member abuttingly supported on the stop member;

a stanchion removably and rotatably received in the sleeve member in a generally upright configuration;

a boom assembly operably coupled to the stanchion, wherein the boom assembly is moveable between a horizontal extended position and a vertical collapsed position;

a height adjustment assembly operably connected to the boom;

a harness operably coupled to the height adjustment assembly; and a cooking surface operably coupled to the harness which can be adjusted vertically by the height adjustment assembly.

2. The outdoor cooking assembly of claim 1, wherein the height adjustment assembly further comprises a heat resistant rope and an adjustment mechanism.

3. The outdoor cooking assembly of claim 2, wherein the height adjustment mechanism is a winch.

4. The outdoor cooking assembly of claim 1, wherein the support assembly is a permanent support assembly that is plumb.

5. The outdoor cooking assembly of claim 4, wherein the block member is a concrete block member.

6. The outdoor cooking assembly of claim 4, wherein the support assembly further comprises a bushing assembly disposed in the sleeve member for receiving the stanchion in an upright configuration without the need for tools.

7. The outdoor cooking assembly of claim 1, wherein the stanchion can be rotated 360 degrees.

8. The outdoor cooking assembly of claim 1, wherein the harness comprises a plurality of heat resistant ropes or cables or rigid steel bars.

9. The outdoor cooking assembly of claim 1, wherein the cooking surface comprises a mesh cooking surface.

10. The outdoor cooking assembly of claim 1, wherein the boom assembly is coupled to the stanchion by a bracket and fastener system.

11. The outdoor cooking assembly of claim 10, wherein the bracket system includes a bracket and fasteners coupled to the stanchion and pivotally coupled to the boom.

12. The outdoor cooking assembly of claim 11, wherein the fasteners further comprise quick release fasteners.

13. The outdoor cooking assembly of claim 12, wherein the quick release fasteners further comprise quick pin fasteners.

14. An outdoor cooking assembly comprising:
a permanent foundational support assembly including a block member having a cavity portion disposed therein, and further including a stop member transversely disposed within the cavity portion;

a sleeve member received in the cavity portion of the block member, the sleeve member abuttingly supported on the stop member;

an upright stanchion rotatably received in the sleeve member without the need for tools, the upright stanchion abuttingly supported on the stop member;

a boom assembly operably coupled to the stanchion;

a height adjustment assembly operably coupled to the boom comprising a heat resistant rope, winch and pulley system;

a harness operably coupled to the height adjustment assembly; and a cooking surface operably coupled to the harness which is vertically adjustable by the height adjustment assembly.

15. The outdoor cooking assembly of claim 14, wherein the stanchion can be rotated 360 degrees.

16. The outdoor cooking assembly of claim 15, wherein the boom assembly is moveable between a horizontal extended position and a vertical collapsed position.

17. The outdoor cooking assembly of claim 16, wherein the cooking assembly is configured to support accessories from the foundational support assembly, wherein the accessories are selected from the group consisting of a campfire table, a swivel chair, a fire wood organizer, a rotating cooking spit, or a campfire bench.

18. An outdoor cooking system comprising:
a plurality of permanent foundational support assemblies, each support assembly including a concrete block member having a cavity portion disposed therein, and further including a stop member transversely disposed within the cavity portion;

a sleeve member received in the cavity portion of each concrete block member, the sleeve member abuttingly supported on the stop member;

an upright stanchion received in the sleeve member and abuttingly supported on the stop member of any one of the plurality of permanent foundational support assemblies, wherein the stanchion can be moved from one of the plurality of support assemblies to another of the plurality of support assemblies without the need for tools;

a boom assembly operably coupled to the stanchion, wherein the boom assembly is moveable between a horizontal extended position and a vertical collapsed position;

a height adjustment assembly operably coupled to the boom;

a harness operably coupled to the height adjustment assembly; and a cooking surface operably coupled to the harness which can be adjusted vertically by the height adjustment assembly.

19. The outdoor cooking system of claim 18, wherein the support assemblies are entirely disposed within a ground surface.

20. The outdoor cooking system of claim 18, wherein the boom assembly is coupled to the stanchion by a bracket and quick release fastener system for moving the boom between the extended position and the collapsed position.

* * * * *